United States Patent [19]

Lode

[11] 3,742,468

[45] June 26, 1973

[54] MEANS FOR THE RELIABLE TRANSMISSION OF DIGITAL SIGNALS ACROSS SLIP RINGS AND THE LIKE

[75] Inventor: Tenny D. Lode, Cherry Hills Village, Colo.

[73] Assignee: Electric Processors, Inc., Englewood, Colo.

[22] Filed: May 3, 1972

[21] Appl. No.: 249,872

[52] U.S. Cl. ... 340/174.1 B, 179/100.2 T, 307/204, 307/219

[51] Int. Cl. .................................................... G11b 5/44

[58] Field of Search .............................. 307/204, 219; 340/174.1 B, 174.1 G, 174.1 H; 179/100.2 T

[56] References Cited

UNITED STATES PATENTS 3,558,909 1/1971 Oshimz et al. ........................ 307/204

*Primary Examiner*—Vincent P. Canney
*Attorney*—Ralph L. Dugger, Nickolas E. Westman et al.

[57] ABSTRACT

A principal application of the subject invention is in magnetic tape digital data recorders of the type in which the tape is wrapped partially around a rotating record/reproduce head assembly. Digital signals are transmitted to and from the rotating head assembly via slip rings, which may be subject to momentary contact interruptions. In one form of the subject invention, a pair of slip rings are used for each digital signal, one carrying the normal form of the signal and the other carrying the same signal in inverted polarity. A flip-flop circuit is used as a data receiving circuit. Current sinking logic circuits, of the type in which a logical 0 is transmitted by the sinking of current, are used. Data is transmitted by setting the data receiving flip-flop to one state or the other via currents transmitted through one slip ring or the other. A mementary open circuit in a slip ring connection will not erroneously alter the state of the data receiving flip-flop and, hence, not result in the transmission of incorrect data.

12 Claims, 2 Drawing Figures

PATENTED JUN 26 1973 3.742.468

SHEET 2 OF 2

MEANS FOR THE RELIABLE TRANSMISSION OF DIGITAL SIGNALS ACROSS SLIP RINGS AND THE LIKE

BACKGROUND OF THE INVENTION

A principal application of the present invention is in magnetic tape digital data recorders of the type employing rotating record/reproduce head assemblies. In such digital data recorders, the magnetic tape used as the recording medium is wrapped partially around a rotating record/reproduce head assembly. During the data recording or reproducing process, the tape is held stationary and the recording or reproducing is accomplished as the recording/reproducing head rotates. Data is recorded or reproduced in blocks of convenient tape length. The tape is moved block by block, as required, between individual block recording and/or reproducing operations.

The arrangement of the tape recording system which is used as an example of an application of the present invention is not shown in detail, because such tape recording systems are known and described in the published literature. For example, a rotating head digital data magnetic tape recorder and reproducer is shown and described on pages 133–135 of the June 7, 1971, issue of Electronics magazine.

In such recorders, electrical digital signals must be transmitted to and from the rotating head assembly. Slip rings have been used in the prior devices for carrying such signals between the rotating head and other equipment with which the rotating head has relative motion. Although slip rings are relatively reliable for transmitting electrical signals, there is always the possibility that dirt, contamination, vibration or other influences will cause momentary high-resistance at the relatively moving portions of the slip ring, or even open contacts. In digital system when electrical pulses form the signals, any contact interruptions or aberrations may appear to be erroneous data pulses and may cause significant system errors.

Current sinking type logic circuit devices are widely used in present day digital systems and will be used as an example in this specification. In current sinking logic, the transmission of a low signal, usually considered to be a binary zero, is accomplished by grounding a line and sinking the current from the inputs of whatever circuits may be connected to that line. A high signal, usually considered to be a binary one, is transmitted by raising the potential of the connecting line to a positive potential, typically of the order of 3 to 5 volts. Little or no current is then drawn by the devices whose inputs are connected to the line. Some current is required to transmit a binary zero signal, while substantially no current is required to transmit a binary one signal. Hence, a momentary erroneously open circuit may momentarily change a zero signal into a one signal, but cannot change a one signal into a zero signal.

SUMMARY OF THE INVENTION

An object of the present invention is to provide reliable means for the transmission of digital signals across slip rings or other contact elements such that erroneous signals are not transferred in the event of momentary high resistance or open connections at the slip ring elements. Other objects and advantages may be seen from the following specification.

In one form of the invention, TTL integrated circuit, current sinking logic circuit devices of the currently well-known 7400 series are employed as the logic circuit elements. Two slip ring assemblies are used for the transmission of each digital signal. The term slip ring, as used herein, means a sliding contact assembly comprising a moving element and a stationary element in sliding electrical contact with each other. The normal or non-inverted form of the digital signal is transmitted across a first slip ring. An inverter is used to generate the complement or inverted form of the digital signal and this inverted form is transmitted across a second slip ring. At the receiving end, a bistable or flip-flop circuit is used to receive the data. A binary zero signal on the first slip ring line will set the flip-flop to a first state and a binary zero signal on the second slip ring line for the same signal will set the flip-flop to a second, opposite state. A simultaneous binary one signal on both lines will not affect the state of the flip-flop; it will simply remain in its previous state. Since the effect, if any, of a momentary high resistance or open circuit slip ring contact is to cause the apparent transmission of two simultaneous ones, this means that such contact interruptions will not cause the transmission of erroneous data. At worst, such contact interruptions will only slightly delay the leading or trailing edges of digital data pulses.

DESCRIPTION OF THE PREFERRED EMBODIMENTS

Figure 1:
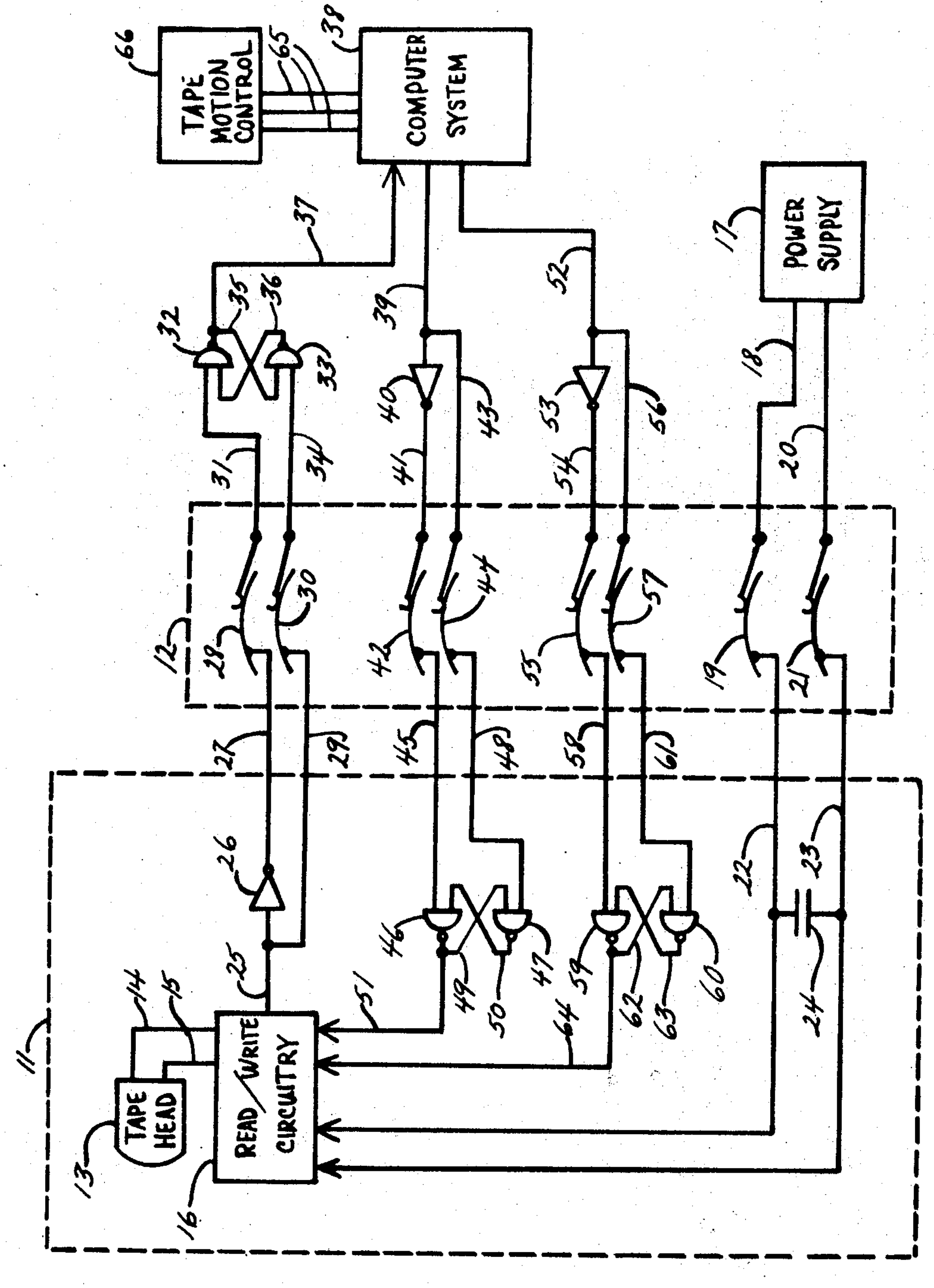
FIG. 1 is a block diagram illustrating a first form of the invention in which the signals are transmitted to and from a rotating head assembly via pairs of slip rings.

FIG. 1 shows a rotating head and electronic assembly 11 and slip ring assembly 12 as part of a magnetic tape digital data recording system. The tape recording/reproducing system is of the type in which the magnetic tape is wrapped partially around the rotating head assembly. In operation, the tape is advanced to a desired point and then held stationary while the data recording and/or reproducing is performed by the rotating head and electronic assembly, which rotates relative to the tape. The tape recording and reproducing system is shown schematically. Such tape recording systems are known and described in the published literature. For example, a rotating head digital data magnetic tape recorder and reproducer is shown and described on Pages 133–135 of the June 7, 1971 issue of Electronics magazine. The rotating head and electronic assembly 11, includes a tape head 13 which is connected via lines 14 and 15 to read or write electronic circuitry 16. The read or write circuitry is for receiving signals from the tape head which are read from the tape, or for writing signals on the tape through the tape head. A power supply 17 is connected via line 18 to a slip ring 19 and via line 20 to slip ring 21. The slip rings include a stationary contact sliding on a rotating ring. Slip ring 19 is connected via line 22 to read/write electronic circuitry 16 and slip ring 21 is connected via line 23 to read/-write electronic circuitry 16. A capacitor 24 is connected across lines 22 and 23. Read/write electronic circuitry 16 is connected via line 25 to the input of an inverter 26 whose output is connected via a line 27 to a slip ring 28. A line 29 connects from line 25 to a slip ring 30. Slip ring 28 is connected via a line 31 to a first input of a NAND gate 32. Slip ring 30 is connected via a line 34 to a first input of a NAND gate 33. NAND gates 32 and 33 are connected together in a bi-stable or flip-flop circuit. A line 35 connects from the output of gate 32 to the second input of gate 33 and a line 36 connects from the output of gate 33 to the second input of gate 32. A line 37 connects from the output of gate 32 to an input of a computer system 38. A line 39 connects from computer system 38 to the input of an inverter 40. The output of inverter 40 is connected via a line 41 to a slip ring 42. A line 43 connects from line 39 to a slip ring 44. Slip ring 42 is connected via line 45 to a first input of a NAND gate 46. A line 48 connects from slip ring 44 to a first input of a NAND gate 47. NAND gates 46 and 47 are connected together in a bi-stable or flip-flop circuit. A line 49 connects from the output of gate 46 to the second input of gate 47 and a line 50 connects from the output of gate 47 to the second input of gate 46. A line 51 connects from the output of gate 46 to an input of read/write electronic circuitry 16. A line 52 connects from computer system 38 to the input of an inverter 53. A line 54 connects from the output of inverter 53 to a slip ring 55. A line 56 connects from line 52 to one side of a slip ring 57. A line 58 connects from slip ring 55 to a first input of a NAND gate 59. A line 61 connects from slip ring 57 to a first input of a NAND gate 60. NAND gates 59 and 60 are also connected together in a bi-stable or flip-flop circuit. A line 62 connects from the output of gate 59 to the second input of gate 60 and a line 63 connects from the output of gate 60 into the second input of gate 59. A line 64 connects from the output of gate 59 to an input of read/write electronic circuitry 16. Computer system 38 is connected via lines 65 to a tape motion control circuit 66.

The object of the system of FIG. 1 is to reliably transmit digital signals to and from rotating head and electronic assembly 11 via slip ring assembly 12. The elements to the right of slip ring assembly 12 in FIG. 1 are stationary or nonrotating elements of the tape recorder system and are connected to the contactors for each slip ring. Motion of the tape, from data block to data block, is controlled by tape motion control 66 under the supervisory control of computer system 38. The tape length respresenting a data block is pulled from a storage cassette, and held in engagement with the rotating head for the read/write function. If a new data block is desired, the tape motion control will advance the tape the desired amount in response to the computer commands. Power supply 17 supplies power to read/write electronic circuitry 16 via slip rings 19 and 21. Capacitor 24 is placed across lines 22 and 23. The value of capacitor 24 is sufficiently large so that in the event of a momentary high resistance or open connection of slip rings 19 or 21, power will continue to be supplied to read/write electronic circuitry 16 by capacitor 24. Operable models have been constructed using 7400 series TTL integrated circuit logical devices. In such models, inverters 26, 40 and 53 and type 7404 inverters and NAND gates 32, 33, 46, 47, 59 and 60 are type 7400 gates.

The transmission channel which transmits a signal from line 52 to line 64 via the stationary contacts and moving elements of slip rings 55 and 57 is a control channel which carries control signals to control whether the read/write electronic circuitry 16 and the entire associated system is operating in a data recording mode or in a data reproducing mode. NAND gates 59 and 60 are arranged in a cross-coupled or flip-flop circuit as explained. In normal operation, high or logical one signal on line 52 will cause a low signal on slip ring 55 because of inverter 53 and a high signal on slip ring 57. The high signal on slip ring 57 is transmitted via line 61 to gate 60. The low signal on slip ring 55 is transmitted via line 58 to gate 59. This will cause the output of gate 59 on lines 62 and 64 to be high. Since both of the inputs to gate 60 are high, its output on line 63 will be low. In TTL logic circuits, an open circuit in the transmission channel is equivalent to a high signal. Hence, a momentary high resistance connection or open circuit between the stationary contactor and moving ring element of slip ring 57 will not affect gate 60 or the signal transmitted to read/write electronic circuitry 16 along line 64. Also, in the event of a momentary high resistance connection or open circuit across slip ring 55, when a high signal is carried on line 52, the flip-flop consisting of NAND gates 59 and 60 will retain its previous state and continue to transmit the high signal on line 64.

Similarly, in the case of a low signal on line 52, the flip-flop consisting of gates 59 and 60 will be set so that the signal on line 64 is low. The output of NAND gate 60 on line 63 will be high, as will the signal on line 58 from inverter 53 and slip ring 55. Thus the output of gate 59 will be low. A momentary high resistance or open circuit connection (a high signal) on slip ring 55 and/or slip ring 57 will not alter the state of the flip-flop consisting of gates 59 and 60 or cause erroneous data to be transmitted on line 64. A high signal on line 61 when the signal on line 62 is low does not change the output of gate 60, and line 58 is already carrying a high signal.

The record data signals are transmitted from computer system 38 to read/write electronic circuitry 16 via slip rings 42 and 44 and the flip-flop consisting of gates 46 and 47. This transmission channel operates in a manner entirely analogous to the operation of the channel through slip rings 55 and 57. The state of the flip-flop formed by NAND gates 46 and 47 will not be changed by high slip ring resistance or open contacts when either a high or low signal is present on line 39. Data read from the tape, when available, is transmitted from read/write electronic circuitry 16 to computer system 38 via the transmission channel which includes slip rings 28 and 30. The operation of this channel for data reading is also entirely analogous to the operation of the two previously described channels except that it transmits data in the opposite direction, namely from the read/write electronic circuitry 16 to the computer system through NAND gates 32 and 33 conected as a flip-flop circuit in the manner shown.

Hence, in the system of FIG. 1, read/write control signals are transmitted through slip rings 55 and 57, record data signals are transmitted through slip rings 42 and 44, and reproduced data signals are transmitted through slip rings 28 and 30 in such manner that a momentary high resistance or open circuit connection of any slip ring will not alter the state of a control or data signal whether the signal is high or low (a one or a zero). At worst, such a contact interruption may slightly delay the transmission of a change of a signal. However, in general, this is far less serious than the transmission of a momentary erroneous signal of incorrect and opposite value.

Figure 2:
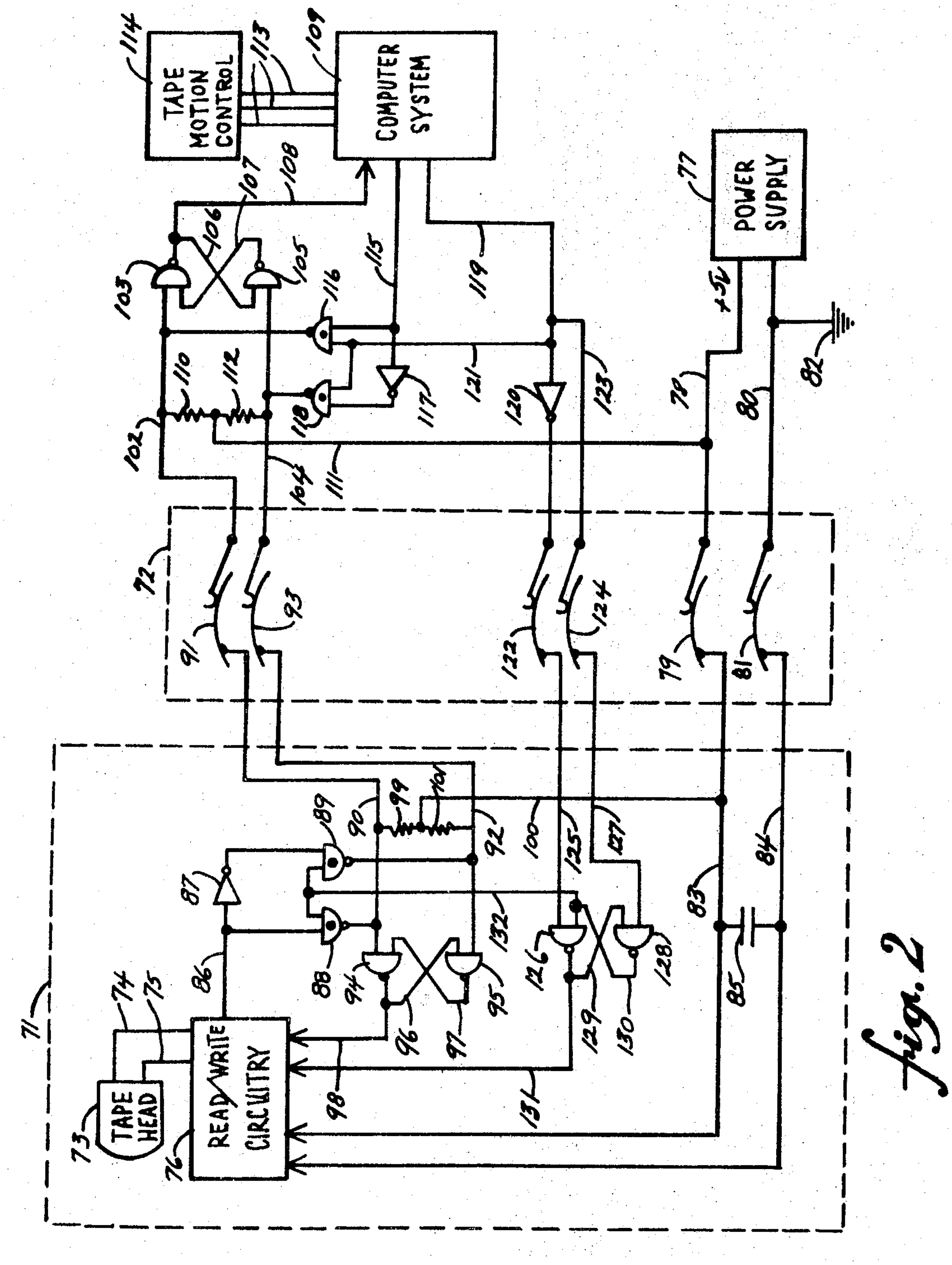
FIG. 2 is a block diagram of a second form of the invention in which record data signals are transmitted to the rotating head assembly or reproduced data signals are transmitted from the rotating head assembly via a single pair of slip rings, depending on whether the system is operating in a record or reproduce mode.

Reference is now made to FIG. 2 which shows a second form of the invention is which data signals may be transmitted both to and from the rotating head assembly via a single pair of slip rings so as to minimize the total number of required slip rings. In FIG. 2, rotating head and associated electronics assembly 71 and slip ring assembly 72 are shown as part of a magnetic tape digital data recording system. The tape recording and reproducing system is of substantially the same type as that shown in FIG. 1 except for the manner in which signals are transmitted to and from rotating assembly 71 via slip ring assembly 72. In rotating head and associated electronics assembly 71, a tape record and reproduce head 73 is connected via lines 74 and 75 to read/write electronic circuitry 76. A power supply 77 is connected via a line 78 to a slip ring 79 and via a line 80 to a slip ring 81. The slip rings each include a contactor and movable element in sliding electrical contact with each other. Line 80 is also connected to ground 82. Slip ring 79 is connected via a line 83 to read/write electronic circuitry 76 and slip ring 81 is connected via a line 84 to read/write electronic circuitry 76. A capacitor 85 is connected between lines 83 and 84, in the manner of the device of FIG. 1. An output of read/write electronics 76 is connected via a line 86 to the input of an inverter 87 and to a first input of an open-collector NAND gate 88. The output of inverter 87 is connected to a first input of an open-collecctor NAND gate 89. The output of gate 88 is connected via a line 90 to a first input of a NAND gate 94 and to a slip ring 91. The output of gate 89 is connected via a line 92 to a first input of a NAND gate 95 and to a slip ring 93. NAND gates 94 and 95 are connected together in a flip-flop circuit. The output of gate 94 is connected via line 96 to the second input of gate 95 and the output of gate 95 is connected via line 97 to the second input of gate 94. The output of gate 94 is also connected via a line 98 to an input of read/write electronic circuitry 76. A resistor 99 is connected from line 90 to a line 100 which is connected to line 83. A resistor 101 is connected from line 92 to line 100. A line 102 connects from slip ring 91 to a first input of a NAND gate 103. A line 104 connects from slip ring 93 to a first input of a NAND gate 105. NAND gates 103 and 105 are connected together in a flip-flop circuit. The output of gate 103 is connected via a line 106 to the second input of gate 105 and the output of gate 105 is connected via a line 107 to the second input of gate 103. The output of gate 103 is also connected via a line 108 to an input of a computer system 109. A resistor 110 is connected from line 102 to a line 111 which is connected to line 78. A resistor 112 is connected from line 104 to line 111. Computer system 109 is connected via lines 113 to a tape motion control 114. An output of computer system 109 is connected via a line 115 to a first input of an open-collector NAND gate 116 and the input of an inverter 117. The output of inverter 117 is connected to a first input of an open-collector NAND gate 118. The output of gate 116 is connected to line 102 and the output of gate 118 is connected to line 104. An output of computer system 109 is connected via a line 119 to the input of an inverter 120. A line 121 connects from line 119 to the second input of gate 116 and the second input of gate 118. The output of inverter 120 is connected to a slip ring 122 and line 119 is connected via a line 123 to a slip ring 124. Slip ring 122 is connected via a line 125 to a first input of a NAND gate 126. Slip ring 124 is connected via a line 127 toa first input of a NAND gate 128. NAND gates 126 and 128 are connected together in a flip-flop circuit. The output of gate 126 is connected via a line 129 to the second input of gate 128 and the output of gate 128 is connected via a line 130 to the second input of gate 126. The output of gate 126 is also connected via a line 131 to an input of read/write electronic circuitry 76. Line 130 is connected via a line 132 to the second input of gate 88 and to the second input of gate 89.

A characteristic of the system of FIG. 1 is that while a control signal (in either record mode or reproduce mode) is continuously transmitted from computer system 38 to read/write electronic circuitry 16 via the path or channel which includes slip rings 55 and 57, only one of the two data signal paths or channels is in use at any given time. During a record operation, data to be recorded will be transmitted to read/write electronic circuitry 16 over the path which includes slip rings 42 and 44, but no data will be transmitted over the path which includes slip rings 28 and 30. During a read operation, data read from the tape will be transmitted to computer system 38 via the path which includes slip rings 28 and 30 but no data will be transmitted via the path which includes slip rings 42 and 44.

In the system of FIG. 2, the two uni-directional data transmission paths of FIG. 1 have been replaced by a single bi-directional data transmission path thereby reducing the total number of required slip rings. In a particular form of the system of FIG. 2, inverters 87, 117 and 120 are type 7404 integrated circuit inverters, NAND gates 94, 95, 103, 105, 126 and 128 are type 7400 integrated circuit gates, and open-collector NAND gates 88, 89, 116 and 118 are type 7403 integrated circuit gates. Resistors 99 101, 110 and 112 are typically 2200 ohm resistors and are used because of the absence of pull-up circuit elements within open-collector gates 88, 89, 116 and 118. In the system of FIG. 2, a high signal on line 119 is used to initiate and maintain a write operation while a low signal is used to initiate and maintain a read operation. A high signal on line 119 through inverter 120, and the flip-flop circuit including gate 126 will cause a low output from the gate 128 which in turn will cause a low signal on line 132, disabling gates 88 and 89, so that they will not produce an output which affects the signals on slip rings 91 and 93. The high signal on line 119 is transmitted to one of the inputs of each of gates 116 and 118. Gates 116 and 118 then are operative to transmit the write data signals on line 115 (through inverter 117 to gate 118) across slip rings 91 and 93 where the signals are received by the flip-flop circuit consisting of gates 94 and 95. The signals are transmitted to read/write electronic circuitry 76 via line 98. During a read operation, the signal on line 119 will be low, disabling gates 116 and 118 so that the gates 116 and 118 will not deliver an output and they will not affect the signals on slip rings 91 and 93. A low signal on line 119 through the flip-flop circuit including gates 126 and 128 will cause the signal on line 132 will be high, thereby making gates 88 and 89 operative. Read data is then transmitted from read/write electronic circuitry 76 through line 86 and inverter 87 to gates 88 and 89 and across slip rings 91 and 93 to the flip-flop circuit consisting of gates 103 and 105 and on to computer system 109 via line 108.

The flip-flop circuit operation using the NAND gates is as described in connection with FIG. 1.

The preceding description has specifically referred to TTL (Transistor-Transistor-Logic) integrated circuit devices of the 7400 series type. These particular integrated circuit devices are conveniently available and widely used at the present time. However, the general concept may be realized with many other types of devices and circuits. A present, two of the major types of logic circuits are current-sinking and current-source circuits. NPN silicon transistors are usually employed as the active elements. In current sink logic, a low signal, usually considered to be a binary zero, is transmitted by the output of the transmitting device pulling the potential on a line down to near ground potential and sinking whatever current is received from the input circuits of the receiving devices. A high signal, usually considered to a binary one, is transmitted by raising the potential of the signal line to a potential of typically several volts positive, relative to ground. In this condition, substantially no current is drawn by the input circuits of the receiving devices. In using such current sink elements in systems of the type described herein, it will generally be desirable to use flip-flops which are set and cleared by momentary grounding or low signals and which will continue to retain their previous state in the presence of high signals.

In a typical current source logic system, current is drawn by the inputs of the receiving devices in the presence of a high signal but little or no current is drawn in the presence of a low signal. In such cases, the receiving flip-flops should be arranged so that they will be set or reset by a momentary high signal and will retain their previous information state in the presence of low signals. In either case, the system is arranged so that information is transmitted across a pair of slip rings and received by a flip-flop circuit which is set or reset by signals which involve the flow of significant currents. The opposite polarity signals do not involve a flow of significant current and leave the flip-flop state unchanged.

The drawings have shown two systems for the transmission of read/write information to and from a rotating electronic package and the transmission of a control signal and power thereto. Similar systems may be arranged for the reliable transmission of any desired number of signal channels in one or both ways across slip rings or similar elements.

The preceding description has been in terms of the transmission of signals across slip rings to and from a rotating electronics package. Substantially the same techniques may be used for the reliable transmission of signals across contact elements other than slip rings which may also be subject to momentary high resistance and/or open-circuit connections. The techniques also may be used for a wide variety of purposes where a momentary high resistance or open-circuit at the contacts causes operational problems.

What I claim is:

1. Means for the transmission of electrical signals from a first assembly to a second assembly through a contact assembly comprising a plurality of electrical contacts each having an input on the first assembly and an output on the second assembly, said first assembly including a source of signals having one of two predetermined states, means connecting said source of signals in said one state to the input of a first electrical contact in said contact assembly, means connected to said source of signals and having a second output providing a signal in a second of said predetermined states, means connecting said second output to the input of a second electrical contact in said contact assembly, said second assembly including a bi-stable circuit having a pair of inputs and a third output, means connecting the inputs of said bi-stable circuit to the outputs of said first and second electrical contacts respectively, means for setting the output of said bi-stable circuit into a first signal state when the signal on said first electrical contact is in said one signal state and means for setting the output of said bi-stable circuit into a second signal state when the signal at said second electrical contact is in said one signal state.

2. The combination of claim 1 further characterized by at least one of said electrical contacts of said contact assembly moving relative to the other during operation and being subject to momentary interruption.

3. The combination of claim 1 further characterized by said bi-stable circuit including a plurality of current sink type logic circuit elements, said one signal state comprising the current sinking state.

4. The combination of claim 1 further characterized by said bi-stable circuit including a plurality of current source type logic circuit elements and by said one signal state being the current source state.

5. The means for transmission of claim 1 wherein said said electrical signals comprise digital signals representing binary ones or zeros.

6. The means for transmission of claim 1 wherein said second assembly comprises a rotating recording and reproducing head for a digital signal information system.

7. The circuit of claim 1 wherein said bi-stable circuit comprises a first and second NAND gate, each having a pair of input terminals and an output terminal, the output of the bi-stable circuit comprising the output of said first NAND gate, one of the inputs of said first NAND gate being connected to the output of said second electrical contact and the other of the inputs of said first NAND gate being connected to the output of said second NAND gate, the inputs of the second NAND gate being connected to the output of said first electrical contact and the output of said bi-stable circuit, respectively.

8. The means for transmission of claim 1 further comprising two sources of electrical signals, one on said first assembly and one on said second assembly, means connecting said two sources to the same first and second electrical contacts, control means to prevent signal transmission from one of the first and second assemblies to the other across said same electrical contacts when the signal source of the other assembly is transmitting signals.

9. Means for the transmission of digital signals in a first mode from a first assembly to a second assembly through a contact assembly including a plurality of electrical contacts, and in a second mode from said second assembly to said first assembly through said contact assembly, including means for controlling and selecting one of said modes, a bi-stable circuit in each of said first and second assemblies, a source of digital signals in each of said first and second assemblies, means in each of said first and second assemblies providing said digital signals in both non-inverted and inverted polarities, means in each of said first and second assemblies connecting said digital signals in one of said polarities to a first electrical contact in said contact assembly and means in each of said first and second assemblies connecting said digital signals of opposite polarity to a second electrical contact in said contact assembly, means in each of said first and second assemblies connecting said bi-stable circuits to said first and second contacts, means in each of said first and second assemblies for setting each of said bi-stable circuits into a first state when the signal on said first contact is of a predetermined state and means in each of said first and second assemblies for setting said bi-stable circuits into a second state when the signal on said second contact is of a predetermined state, means for disabling the transmission of signals from said second assembly through said first and second contact when said means for transmission is in said first mode, and means for disabling the transmission of signals from said first assembly through said first and second contacts when said means for transmission is in said second mode.

10. The combination of claim 9 further characterized by at least one of said electrical contacts of said contact assembly being subject to momentary interruption.

11. The combination of claim 9 further characterized by the bi-stable circuits in said assemblies including a plurality of current sink type logic circuit elements and by said predetermined signal states being the current sinking state.

12. The combination of claim 9 further characterized by the bi-stable circuits in said assemblies including a plurality of current source type logic circuit elements and by said predetermined signal states being the current source state.

* * * * *